US012353738B2

(12) United States Patent
Kim

(10) Patent No.: US 12,353,738 B2
(45) Date of Patent: Jul. 8, 2025

(54) TECHNIQUES FOR MEMORY SYSTEM STANDBY MODE CONTROL

(71) Applicant: Micron Technology, Inc., Boise, ID (US)

(72) Inventor: Junam Kim, Seoul (KR)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/444,064

(22) Filed: Feb. 16, 2024

(65) Prior Publication Data

US 2024/0281158 A1   Aug. 22, 2024

Related U.S. Application Data

(60) Provisional application No. 63/446,696, filed on Feb. 17, 2023.

(51) Int. Cl.
*G06F 3/06* (2006.01)

(52) U.S. Cl.
CPC .......... *G06F 3/0634* (2013.01); *G06F 3/0604* (2013.01); *G06F 3/0683* (2013.01)

(58) Field of Classification Search
CPC ....................................................... G06F 3/06
See application file for complete search history.

(56) References Cited

U.S. PATENT DOCUMENTS

| 10,732,871 | B2* | 8/2020 | Benisty ................... G06N 3/08 |
| 2018/0181411 | A1* | 6/2018 | Rothman .............. G06F 1/3234 |
| 2022/0043586 | A1* | 2/2022 | Liang .................... G06F 3/0625 |
| 2022/0397953 | A1* | 12/2022 | Wang .................... G06F 1/3225 |

* cited by examiner

*Primary Examiner* — Khoa D Doan
(74) *Attorney, Agent, or Firm* — Holland & Hart LLP

(57) ABSTRACT

Methods, systems, and devices for memory system standby mode control are described. A system may be configured to support a memory system transmitting an indication of a duration to a host system in response to receiving a standby indication from the host system. For example, a memory system may determine a set of background operations to be performed at the memory system and, in response to a standby indication, may determine a duration associated with performing at least a subset of the set of background operations. In response to receiving the indication of the duration, the host system may delay an isolation of the memory system from one or more voltage sources, which may include the host system signaling an approval or a different duration to the memory system, during which the memory system may proceed with at least some of the determined set of background operations.

20 Claims, 7 Drawing Sheets

TECHNIQUES FOR MEMORY SYSTEM STANDBY MODE CONTROL

CROSS REFERENCE

The present application for patent claims priority to U.S. Patent Application No. 63/446,696 by Kim, entitled "TECHNIQUES FOR MEMORY SYSTEM STANDBY MODE CONTROL," filed Feb. 17, 2023, which is assigned to the assignee hereof, and which is expressly incorporated by reference herein.

TECHNICAL FIELD

The following relates to one or more systems for memory, including techniques for memory system standby mode control.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
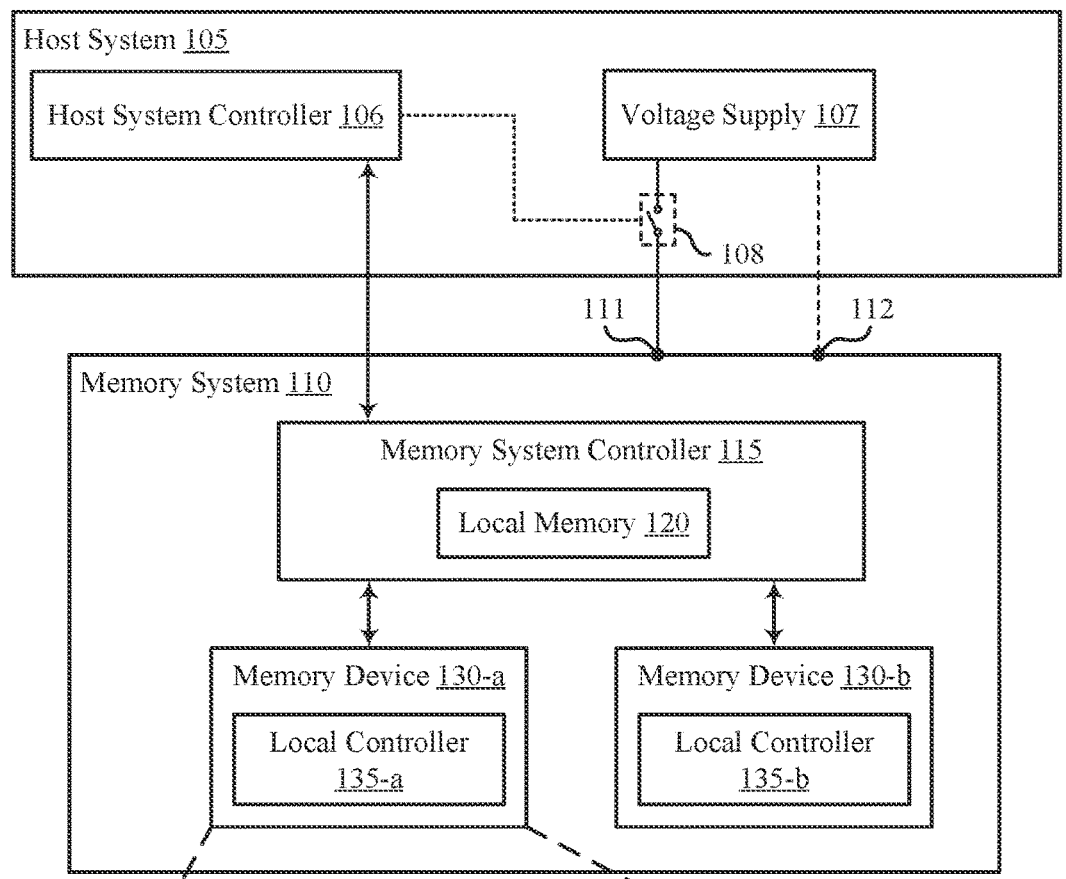
FIG. 1 illustrates an example of a system that supports techniques for memory system standby mode control in accordance with examples as disclosed herein.
Figure 1:
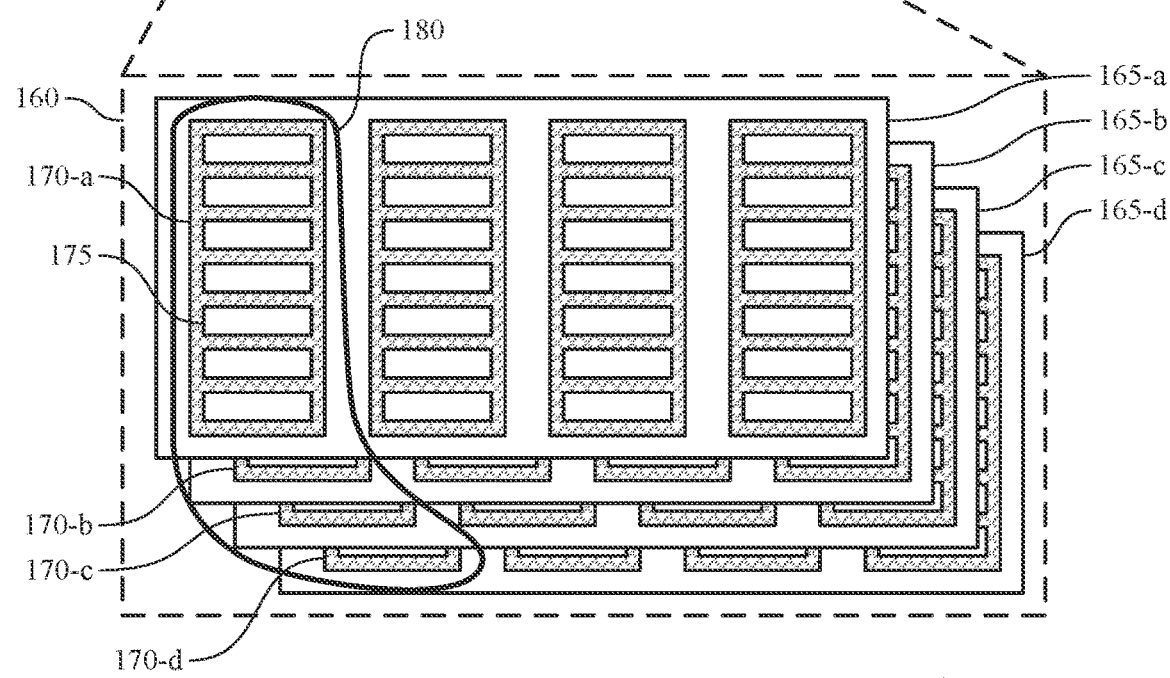

A system in accordance with examples disclosed herein may include a host system and a memory system that is coupled with the host system and configured to store data accessible by the host system (e.g., in response to read commands from the host system). In some examples, the host system may be configured to command the memory system to enter a standby mode, which may be followed by the host system isolating the memory system from one or more voltage sources (e.g., to reduce power consumption by the system). In response to receiving a standby command from the host system, the memory system may conclude or refrain from performing one or more types of operations, such as background operations (e.g., maintenance operations), and enter the standby mode. In the standby mode, the memory system may be safely decoupled from the one or more voltage sources and may operate in a reduced power configuration. In some cases, however, the memory system may receive a standby command while attempting to perform background operations, and the memory system may be unable to complete the background operations. Thus, in some examples, standby commands from a host system may impair an ability of the memory system to complete background operations, which may adversely affect performance characteristics of the memory system.

As described herein, a system may be configured to support a memory system transmitting an indication of a duration to a host system in response to receiving a standby indication (e.g., a standby command, a standby request) from the host system. For example, a memory system may determine a set of background operations to be performed at the memory system and, in response to a standby indication, may determine a duration associated with performing at least a subset of the set of background operations. In some examples, such techniques may be performed based on a type of background operations, such as determining an indicated duration, or determining a subset of background operations, or determining whether to transmit a duration indication based on a degree of importance of the background operations (e.g., in accordance with evaluations based on critical or non-critical background operations). In response to receiving the indication of the duration, the host system may delay an isolation of the memory system from one or more voltage sources, which may include the host system signaling an approval or a different duration (e.g., a negotiated duration) to the memory system, during which the memory system may proceed with at least some background operations. In some other examples, the host system may refrain from delaying the isolation of the memory system from one or more voltage sources, which may include the host system signaling a refusal of the received duration indication. Thus, in accordance with these and other techniques for negotiating standby mode control, a system may be configured to support an improved balance between reduced power consumption and management of memory system maintenance.

Figure 2:
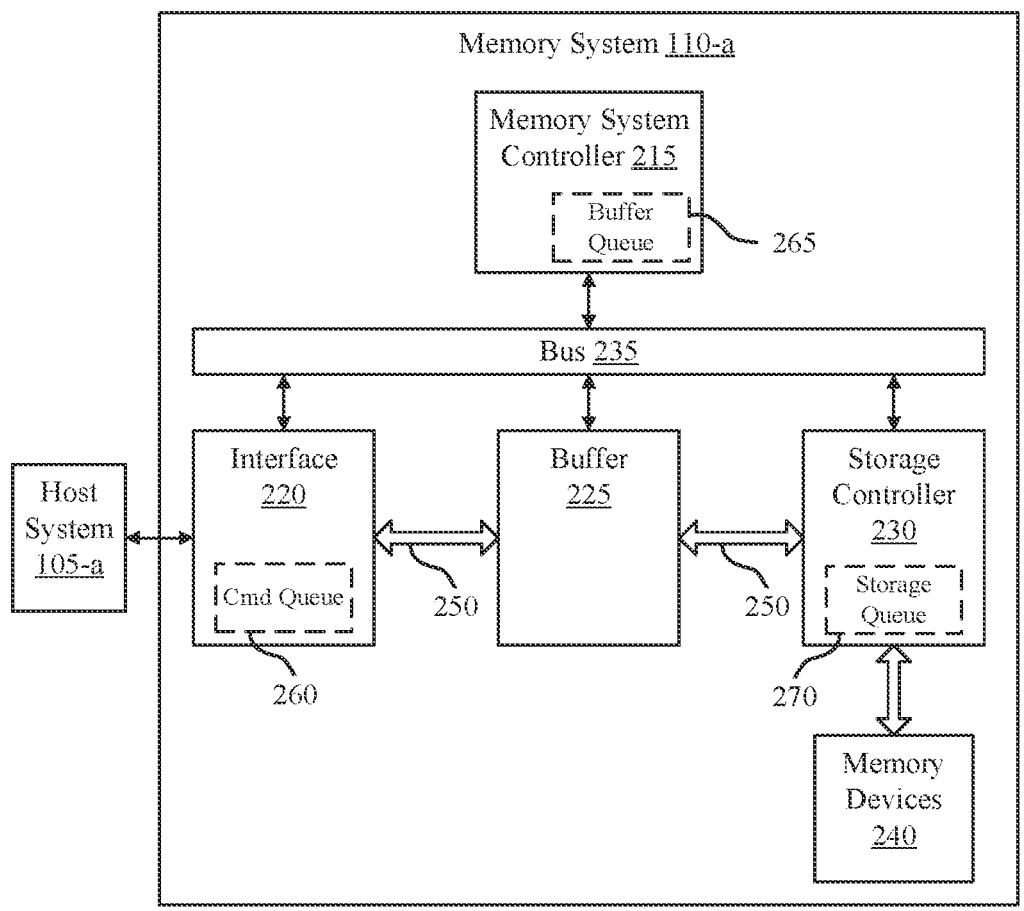
FIG. 2 illustrates an example of a system that supports techniques for memory system standby mode control in accordance with examples as disclosed herein.

Features of the disclosure are initially described in the context of systems and devices with reference to FIGS. 1 and 2. Features of the disclosure are described in the context of a process flow with reference to FIG. 3. These and other features of the disclosure are further illustrated by and described in the context of apparatus diagrams and flowcharts that relate to techniques for memory system standby mode control with reference to FIGS. 4 through 7.

FIG. 1 illustrates an example of a system 100 that supports techniques for memory system standby mode control in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The host system 105 may include a voltage supply 107, which may include one or more voltages sources that provide power for various operations of the host system 105, the memory system 110, or both. To support the operations of the memory system 110, one or more voltage sources of the voltage supply 107 may be coupled with the memory system 110 via one or more power supply lines, which may each be associated with a voltage level (e.g., respective power supply lines associated with voltages designated as VCC, VCCQ, or VCCQ2, among other voltage levels or combinations thereof). The host system 105 may also include a switching component 108, which may include one or more transistors, one or more relays, or other components operable to couple the one or more voltage sources of the voltage supply 107 with the memory system 110 (e.g., via one or more voltage inputs 111) or to isolate the one or more voltage sources of the voltage supply 107 from the memory system 110. One or more control terminals (e.g., a gate node, a control node) of the switching component 108 may be coupled with the host system controller 106 via one or more control lines, which may support the host system controller 106 controlling the state or transitions between states of the switching component 208 (e.g., opening or closing an electrical connection between one or more voltage sources of the voltage supply 107 and the memory system 110). For example, the switching component 208 may be switched on or off (e.g., by the host system controller 106) to manage power consumption. In such an example, the memory system 110 may enter a standby mode before the switching component 208 is switched off such that the memory system 110 may safely handle data. In some examples, a non-switched voltage source line may be coupled between a voltage source of the voltage supply 107 and a voltage input 112. The non-switched voltage source line may be configured for coupling with a voltage source that supports baseline or idle operations such as receiving power-on signaling or other signaling. Additionally, or alternatively, a non-switched voltage source may include a ground source (e.g., a chassis ground) that is always coupled between the host system 105 and the memory system 110 (e.g., via a voltage input 112).

The host system 105 may control the switching component 108 to support various modes of operation of the system 100. For example, in a normal operating mode, the host system 105 may operate the switching component 108 to couple the memory system 110 with one or more voltage sources of the voltage supply 107 to support various operations of the memory system 110. In some examples, the host system 105 may be configured to command the memory system 110 to enter a standby mode, which may be followed by the host system 105 isolating the memory system 110 from one or more voltage sources of the voltage supply 107 via the switching component 108 (e.g., to reduce power consumption by the system 100).

The host system 105 may command the memory system 110 to enter one of multiple standby (e.g., suspend) modes. In some examples, the host system 105 may perform an evaluation of a background operation status of the memory system 110 (e.g., checking a BKOPS status in a register of the memory system 110). For example, for a run-time suspend mode, the host system 105 may command the memory system 110 to enter a standby mode if a status satisfies a threshold (e.g., whether a priority of background operations is equal to or greater than a threshold priority). In some other examples, such as a system suspend mode or a power down suspend mode, the host system 105 may not evaluate a background operation status. In some implementations, different standby modes may be associated with different power mode levels, different couplings of voltages, or various combinations thereof. For example, for a run time suspend mode or a system suspend mode, power mode level may be defined during driver initialization. Additionally, or alternatively, a run time suspend mode, a system suspend mode, or both may be associated with some voltage sources being coupled with the memory system 110 (e.g., voltage sources associated with voltages VCCQ, VCCQ2, or both) and other voltage sources being isolated from the memory system 110 (e.g., a voltage source associated with a voltage VCC). In another example, in a power suspend mode, a different set of voltages sources may be isolated from the memory system 110 (e.g., voltage sources associated with voltages VCC, VCCQ, and VCCQ2 each being isolated).

In response to receiving a standby command from the host system 105, the memory system 110 may conclude or refrain from performing one or more types of operations, such as background operations (e.g., wear leveling, background refresh, garbage collection, scrub, block scans, health monitoring, or others, or any combination thereof), and may enter the standby mode. In the standby mode, the memory system 110 may be safely decoupled from the voltage supply 107 and may operate in a reduced power configuration. In some cases, however, the memory system 110 may receive a standby command from the host system 105 while attempting to perform background operations, and the memory system 110 may be unable to complete the background operations.

As described herein, the system 100 may be configured to support the memory system 110 transmitting an indication of a duration to the host system 105 in response to receiving a standby indication (e.g., a standby command, a standby request, a start stop unit (SSU) command) from the host system 105. For example, the memory system 110 may determine a set of background operations to be performed at the memory system 110 and, in response to a standby indication from the host system 105, may determine a duration associated with performing at least a subset of the set of background operations. Thus, in some examples, the memory system 110 may respond to the host system 105 without entering a sleep mode (e.g., directly) by reporting a duration associated with performing at least the subset of background operations, which may be independent from an urgency of background operations (e.g., may be reported even if the memory system 110 is not operating in an urgent background operation mode). In some examples, if the memory system 110 is operating in an urgent mode of background operations (e.g., as indicated by to the host system 105 as a background operation type or urgency), the host system 105 may delay isolating the memory system 110 from the voltage supply 107 by a default duration (e.g., a runtime suspend time, two seconds, three seconds). The memory system 110 may, however, transmit an indication of the duration and, in response, the host system 105 may delay isolation from the voltage supply 107 by a duration that is longer than the default duration, which may support the memory system 110 delaying entry into the standby mode and performing additional background operations. In some examples, delaying the isolation of the memory system 110 from the voltage supply 107 may be accompanied by the host system 105 signaling an approval or acknowledgment of the duration, or signaling an indication of a different duration (e.g., a negotiated duration) to the memory system 110, during which the memory system 110 may proceed with at least some background operations. In some other examples, the host system 105 may refrain from delaying the isolation of the memory system 110 from the voltage supply 107, which may include the host system 105 signaling (e.g., to the memory system 110) a refusal or negative acknowledgment of the received duration indication.

The system 100 may include any quantity of non-transitory computer readable media that support techniques for memory system standby mode control. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

FIG. 2 illustrates an example of a system 200 that supports techniques for memory system standby mode control in accordance with examples as disclosed herein. The system 200 may be an example of a system 100 as described with reference to FIG. 1, or aspects thereof. The system 200 may include a memory system 110-a configured to store data received from the host system 105-a and to send data to the host system 105-a, if requested by the host system 105-a using access commands (e.g., read commands or write commands).

The memory system 110-a may include one or more memory devices 240 to store data transferred between the memory system 110-a and the host system 105-a (e.g., in response to receiving access commands from the host system 105-a). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 110-a may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 110-a may include multiple storage controllers 230 (e.g., a different storage controller 230 for each type of memory device 240).

In some cases, a storage controller 230 may implement aspects of a local controller 135 as described with reference to FIG. 1.

The memory system 110-a may include an interface 220 for communication with the host system 105-a, and a buffer 225 for temporary storage of data being transferred between the host system 105-a and the memory devices 240. The interface 220, buffer 225, and storage controller 230 may support translating data between the host system 105-a and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 105-a. In some examples, read commands may be added to a queue without an operation to match the address to addresses already in the buffer 225 (e.g., without a cache address match or lookup operation).

The memory system 110-a also may include a memory system controller 215 for executing the commands received from the host system 105-a, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 105-a is processed concurrently by the memory system 110-a. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 110-a.

Data transferred between the host system 105-a and the memory devices 240 may be conveyed along a different path in the memory system 110-a than non-data information (e.g., commands, status information). For example, the system components in the memory system 110-a may communicate with each other using a bus 235, while the data may use the data path 250 through the data path components instead of the bus 235. The memory system controller 215 may control how and if data is transferred between the host system 105-a and the memory devices 240 by communicating with the data path components over the bus 235 (e.g., using a protocol specific to the memory system 110-a).

If a host system 105-a transmits access commands to the memory system 110-a, the commands may be received by the interface 220 (e.g., according to a protocol, such as a UFS protocol or an eMMC protocol). Thus, the interface 220 may be considered a front end of the memory system 110-a. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 105-a. For a write command, this may include receiving data from the host system 105-a and moving the data to one or more memory devices 240. In either case, the memory system controller 215 may use the buffer 225 for, among other things, temporary storage of the data being received from or sent to the host system 105-a. The buffer 225 may be considered a middle end of the memory system 110-a. In some cases, buffer address management (e.g., pointers to address locations in the buffer 225) may be performed by hardware (e.g., dedicated circuits) in the interface 220, buffer 225, or storage controller 230.

To process a write command received from the host system 105-a, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 105-a and at least portions of the access commands may be processed concurrently.

If the buffer 225 has sufficient space to store the write data, the memory system controller 215 may cause the interface 220 to transmit an indication of availability to the host system 105-a (e.g., a "ready to transfer" indication), which may be performed in accordance with a protocol (e.g., a UFS protocol, an eMMC protocol). As the interface 220 receives the data associated with the write command from the host system 105-a, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 110-a. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 105-a, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

After the data has been stored in the buffer 225 by the storage controller 230, the data may be transferred from the buffer 225 and sent to the host system 105-a. For example, the memory system controller 215 may cause the interface 220 to retrieve the data from the buffer 225 using the data path 250 and transmit the data to the host system 105-a (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 105-a has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105-a and physical addresses (e.g., physical block addresses) associated with memory cells within the memory devices 240. For example, the host system 105-a may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The system 200 may be configured to support the memory system 110-a transmitting an indication of a duration to the host system 105-a in response to receiving a standby indication (e.g., a standby command, a standby request) from the host system 105-a. For example, the memory system 110-a may determine a set of background operations to be performed at the memory system 110-a and, in response to a standby indication, may determine a duration associated with performing at least a subset of the set of background operations. In response to receiving the indication of the duration, the host system 105-a may delay an isolation of the memory system 110-a from one or more voltage sources (e.g., of a voltage supply 107), which may include the host system 105-a signaling an approval, an acknowledgment, or a different duration (e.g., a negotiated duration) to the memory system 110-a, during which the memory system 110-a may proceed with at least some background operations.

Figure 3:
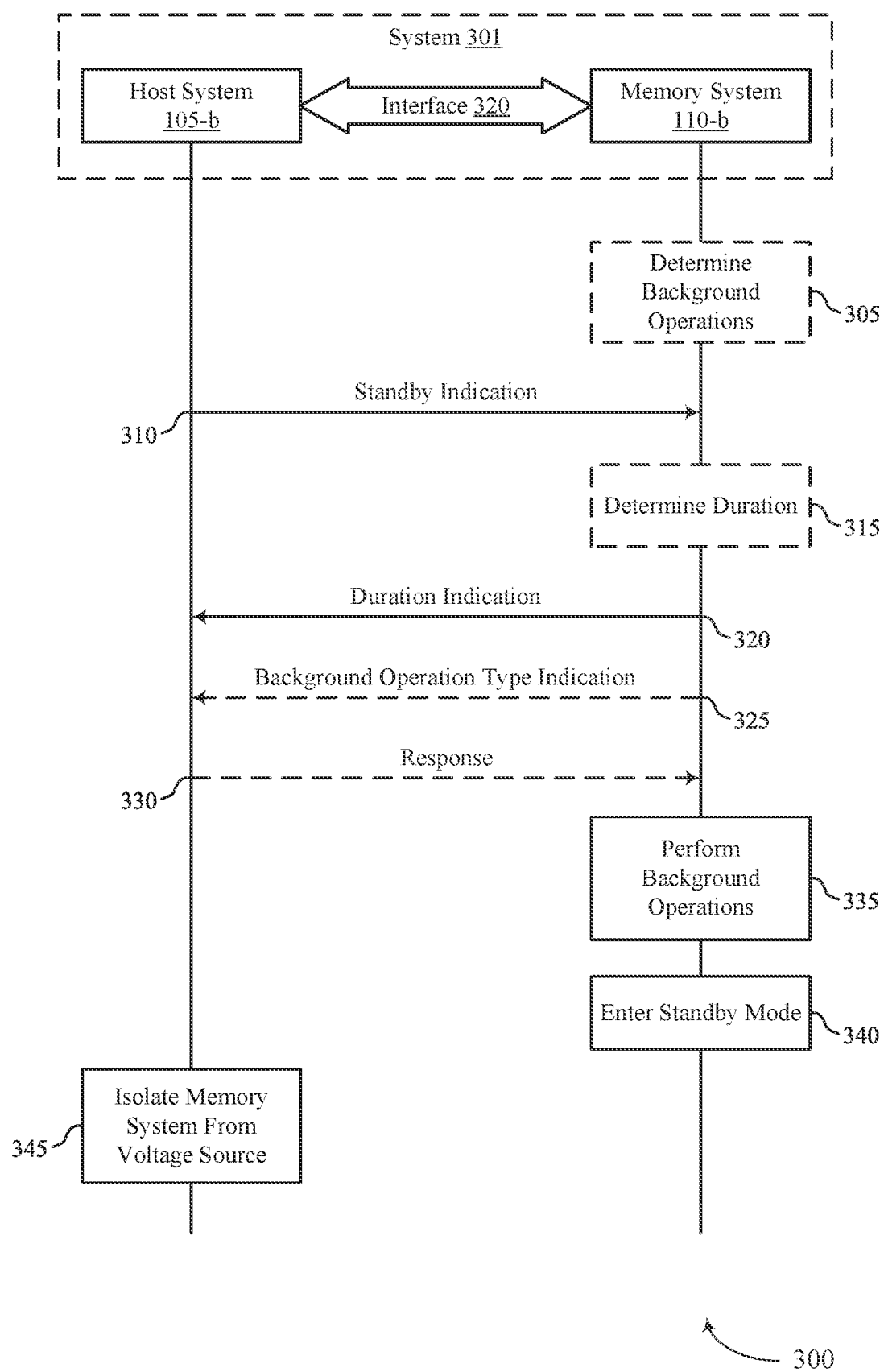
FIG. 3 illustrates an example of a process flow that supports techniques for memory system standby mode control in accordance with examples as disclosed herein.

FIG. 3 illustrates an example of a process flow 300 that supports techniques for memory system standby mode control in accordance with examples as disclosed herein. Operations of the process flow 300 may be performed by one or more components of a host system 105-b (e.g., a host system controller 106 of the host system 105-b) and a memory system 110-b (e.g., a memory system controller 115, a local controller 135, or a combination thereof of the memory system 110-b) of a system 301, which may be examples of the respective components described with reference to FIGS. 1 and 2. In various examples, the memory system 110-b may be configured as a standalone NAND device, or a managed NAND device, among other logical configurations or memory architecture configurations.

In some examples, at least the signaling between the host system 105-b and the memory system 110-b may be conveyed via an interface 320, which may be or include a physical host interface in accordance with a design configuration or a memory standard (e.g., a UFS standard). The interface 320 also may include or be accompanied by a power supply interface associated with one or more voltage sources (e.g., of a voltage supply 107), as described with reference to FIG. 1. The process flow 300 illustrates examples of techniques that support the memory system 110-b transmitting an indication of a duration to the host system 105-b in response to receiving a standby indication (e.g., a standby command, a standby request) from the host system 105-b, which may improve a balance between reduced power consumption by the system 301 and maintenance of the memory system 110-b.

In some examples, at 305, the memory system 110-b may determine background operations to be performed at the memory system 110-b. For example, the memory system 110-b may determine a queue of one or more background operations such as flush operations, folding operations, wear-leveling operations, garbage collection operations, caching operations, media management operations, background refresh operations, health monitoring operations, and other operations. In some examples, the memory system 110-b may also determine a characteristic of the background operations (e.g., a type of background operations, a degree of urgency of background operations), which may be associated with one or more criteria for determining the background operations (e.g., an amount of available space at the memory system 110-b, an amount of space in a cache of the memory system, a degree of wear or wear differential at the memory system 110-b, an error state of the memory system 110-b). The background operations may be supported by the memory system 110-b being coupled with a voltage supply 107 (e.g., of or in communication with the host system 105-b).

At 310, the host system 105-b may transmit a standby indication (e.g., an indication for the memory system 110-b to enter a standby mode, an SSU command), which may be received by the memory system 110-b. The host system 105-b may transmit the standby indication as a command or a request during a period of low processing or memory access activity, as a part of a power saving or low-power (e.g., low-battery) state, or in response to completing an operation. In some examples, the host system 105-b may transmit the standby indication as an inflexible command, the memory system 110-b may enter a standby mode within a fixed runtime suspend duration (e.g., two seconds, three seconds) in response to receiving the command. In some other examples, the host system 105-b may transmit the standby indication as a request or a flexible command, and the memory system 110-b may not enter a standby mode in accordance with a fixed duration.

In some examples, at 315, the memory system 110-b may determine a duration, which may be associated with a delayed entry into the standby mode, or with the memory system 110-b performing background operations. For example, in response to receiving the standby indication of 310, the memory system 110-b may determine a duration to delay entry into the standby mode, which may be a duration associated with performing at least a subset of the background operations determined at 305 (e.g., all of the operations determined at 305, fewer than all of the background operations determined at 305). In some cases, the duration may be determined at 315 based on a type of the background operations determined at 305. For example, the memory system 110-b may determine the duration at 315 based on which of the background operations determined at 305 are to be performed (e.g., relatively high-priority media management operations), or a status of the memory system 110-b (e.g., a maintenance status, a health status), such that the memory system 110-b may use characteristics (e.g., level of importance, priority) of the background operations, among other evaluations to determine the duration. In some examples, the memory system 110-b may determine the duration by selecting a set or subset of the background operations and determining characteristics of the set or subset of the background operations, as determined at 305. In some examples, a duration determined at 315 may be limited to a configured (e.g., longest) duration that may be indicated by the memory system 110-b. In some examples, a duration determined at 315 may be selected from a set of discrete durations (e.g., in accordance with a bitwise identifier). In some other examples, the memory system 110-b may be limited to indicating a single value (e.g., associated with a single duration), in which case a determination of 315 may be omitted.

At 320, the memory system 110-b may transmit a duration indication, which may be received by the host system 105-b. For example, in response to receiving the standby indication of 305, the memory system 110-b may transmit an indication of the duration determined at 315. In some examples, the memory system 110-b may transmit the indication of the duration as one or more bits, which may include the memory system 110-b storing the indication in a register of the memory system 110-b (e.g., a mode register, an attribute register) that may be read by (e.g., polled by, retrieved by) the host system 105-b. The duration indicated may be different than a duration associated with completing the background operations determined at 305, such as being a duration associated with completing a set or subset of the background operations determined at 305, or another duration. In some examples, the memory system 110-b may transmit the duration indication based on the type of the background operations determined at 305. For example, the memory system 110-*b* may transmit a duration indication if high-priority background operations were determined, and may not transmit a duration indication if low-priority background operations were determined.

In some examples, at 325, the memory system 110-*b* may transmit a type indication (e.g., an indication of the background operation type) to the host system 105-*b*. For example, the memory system 110-*b* may transmit an indication of the type of background operations (e.g., a categorization of media management operations such as flush operations, garbage collection, wear leveling, an indication of a background operation priority) to be performed by the memory system 110-*b*. The memory system 110-*b* may transmit the type indication via a register (e.g., a mode register, an attribute register) of the memory system 110-*b*. For example, the memory system 110-*b* may adjust a register of the memory system 110-*b* based on a type of background operations determined at 305, such that the host system 105-*b* may receive (e.g., access) the type indication by reading the type indication from the register of the memory system 110-*b*.

In some examples, at 330, the host system 105-*b* may transmit a response to the duration indication of 320, which may be received by the memory system 110-*b*. For example, in response to receiving the indication of the duration, the host system 105-*b* may transmit a response including an approval (e.g., an acknowledgment) or a rejection (e.g., a negative acknowledgment) of the indicated duration, among other responsive signaling. In some examples, the host system 105-*b* may approve an indicated duration associated with certain background operations, such as those that support reduced latency, increased available space (e.g., flush operations and other operations that free up space in a cache or other storage location), or increased reliability. A response of approval or acknowledgment by the host system 105-*b* may indicate, to the memory system 110-*b*, that the memory system 110-*b* may safely proceed with background operations without the host system 105-*b* isolating the memory system 110-*b* from a voltage source. An absence of a response may indicate that the host system 105-*b* did not receive the duration indication of 320, and that the host system 105-*b* may instead proceed with default isolation timing. Thus, by transmitting an approval or acknowledgment of the duration indication of 320, the host system 105-*b* may enable proper operation of the memory system 110-*b*.

In some examples, the host system 105-*b* may reject the indicated duration, which may be based on the type of the background operations (e.g., an indication of how urgent background operations are), or an operating mode or characteristic of the host system 105-*b*, among other criteria. In various examples, the host system 105-*b* may reject the indicated duration by refusing it entirely, or the host system 105-*b* may refuse the indicated duration by indicating a different duration (e.g., based on a background operation type indicated at 325). For example, the host system 105-*b* may reject a duration associated with lower priority operations (e.g., wear leveling), but may allow a duration associated higher priority operations that support higher performance (e.g., garbage collection operations that may free up space). In some examples, the host system 105-*b* may respond with an indication of a shorter duration, in which case the memory system 110-*b* may pare down operations relative to those associated with the duration indicated at 320.

At 335, the memory system 110-*b* may perform one or more background operations (e.g., based on transmitting the duration indication at 320). In some examples, the memory system 110-*b* may perform all background operations associated with the duration indicated at 320. For example, if the memory system 110-*b* receives an indication of an approval or acknowledgment of the indicated duration of 320, the memory system 110-*b* may perform background operations based on a delayed entry into a standby mode. In some other examples, the memory system 110-*b* may not receive an indication of an approval of the indicated duration of 320 (e.g., in the absence of a response of 330, when responsive signaling of 330 is omitted), but may proceed with at least a portion of the background operations determined at 305 (e.g., under an assumption that an indicated duration of 320 is understood by or honored by the host system 105-*b*, under an assumption that the host system 105-*b* would explicitly reject an indicated duration).

In some examples, the memory system 110-*b* may receive a response indicating a rejection of the duration indicated at 320, but may receive an indication of a different duration in the response signaling of 330. In response to receiving a response indicating a different duration, the memory system 110-*b* may perform a set or subset of the background operations. The memory system 110-*b* may select at least a portion of the background operations as having a relatively high priority (e.g., as a ranked selection). In some examples, the memory system 110-*b* may select at least a portion of the background operations based on a duration to perform the operation (e.g., to avoid exceeding an allowed duration for performing background operations).

In some examples, the memory system 110-*b* may not perform background operations associated with a delayed entry into the standby mode. For example, the memory system 110-*b* may receive a response from the host system 105-*b* indicating a rejection of the duration indicated at 320, or may not receive a response at 320 (e.g., due to a response not being transmitted by the host system 105-*b*, due to a response not being successfully conveyed over the interface 320) and, in response, the memory system 110-*b* may not perform the background operations (e.g., all background operations, a set of the background operations, a subset of the background operations).

At 340, the memory system 110-*b* may enter a standby mode (e.g., after performing the background operations of 335, in response to an elapsed duration of a timer, associated with the duration indicated at 320 or a different duration indicated at 330). The standby mode may be associated with various system modes in accordance with a power mode state machine (e.g., a sleep mode, a suspend mode, a UFS-Sleep mode, a UFS-DeepSleep Mode, or another mode). While in the standby mode, the memory system 110-*b* may not rely on at least one voltage source (e.g., coupled with one or more voltage inputs 111) of the voltage supply 107, but may still be coupled with one or more other voltage sources. For example, while in the standby mode, the memory system 110-*b* may remain coupled with a voltage source (e.g., coupled with one or more voltage inputs 112) of the voltage supply 107 that supports one or more operations (e.g., idle operations, logic operations) but may be isolated from another voltage source (e.g., voltage input 111) of the voltage supply 107 that supports other operations (e.g., access operations).

At 345, the host system 105-*b* may isolate the memory system 110-*b* from one or more voltage sources (e.g., associated with one or more voltage inputs 111) of the voltage supply 107. For example, the host system 105-*b* may initiate a timer with a duration that is based on the duration indicated by the memory system 110-*b* at 320, or a duration that is indicated by the host system 105-*b* (e.g., in a response of 330, where applicable), and the host system 105-*b* may isolate the memory system 110-*b* from at least one voltage source (e.g., coupled with one or more voltage inputs 111) of the voltage supply 107 in response to the initiated timer elapsing or otherwise satisfying a threshold duration. Such a timer may be initiated relative to various operations, such as being initiated on transmission of a standby indication at 310, or on reception of a duration indication at 320, or on transmission of a response at 330, among other initiating criteria. To isolate the memory system 110-*b* from the one or more voltage sources, the host system 105-*b* may toggle a switching component (e.g., the switching component 108) to an electrically open condition. After isolating the memory system 110-*b* from the voltage source, the host system may return to coupling the memory system 110-*b* with the voltage source based on various criteria, which may be accompanied by an indication to the memory system to exit the standby mode.

Thus, one or more aspects of the process flow 300 may be configured to support the memory system 110-*b* transmitting an indication of a duration to the host system 105-*b* in response to receiving a standby indication from the host system 105-*b*. In response to receiving the indication of the duration, the host system 105-*b* may delay an isolation of the memory system 110-*b* from one or more voltage sources, during which the memory system 110-*b* may proceed with at least some background operations. In accordance with these and other techniques for negotiating standby mode control, the process flow 300 may thus be configured to support an improved balance between reduced power consumption and management of memory system maintenance.

Figure 4:
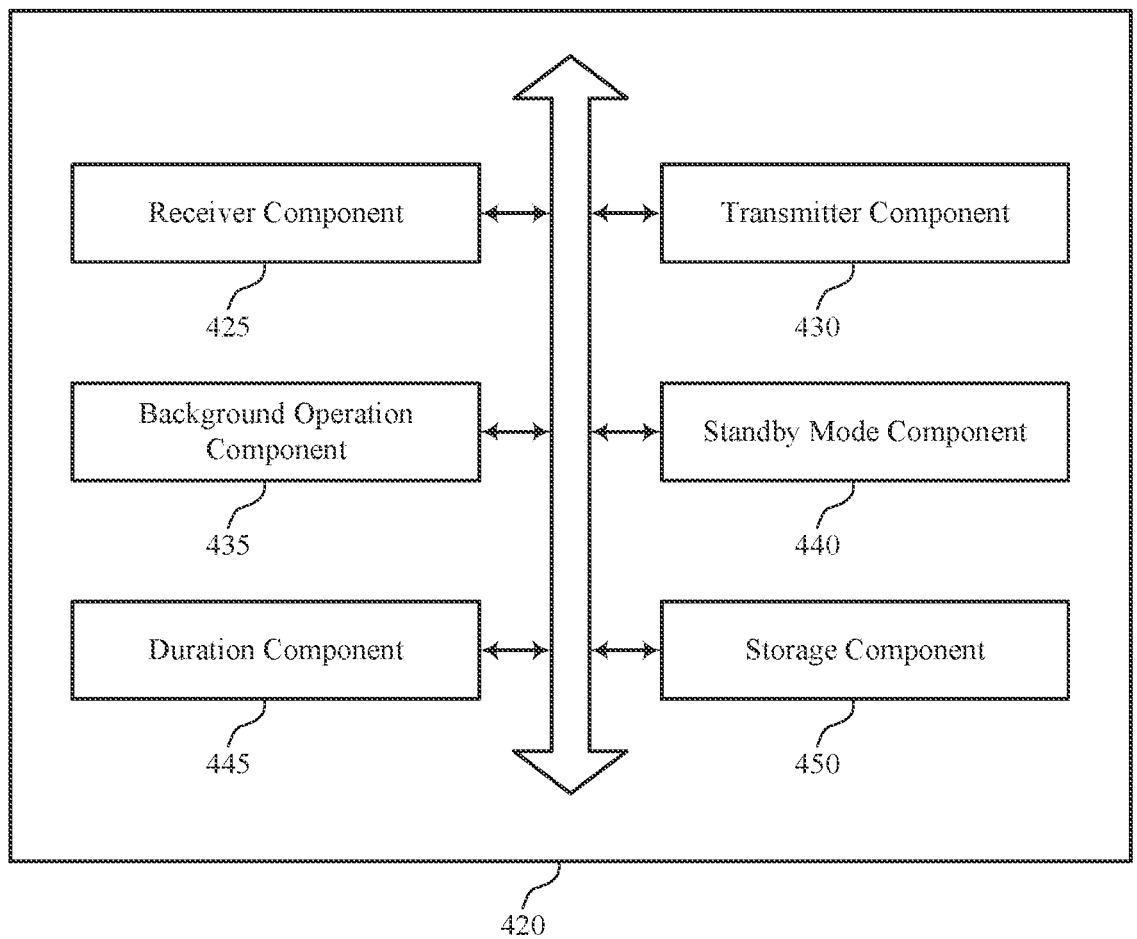
FIGS. 4 and 5 show block diagrams of a memory device and a host device, respectively, that support techniques for memory system standby mode control in accordance with examples as disclosed herein.

FIG. 4 illustrates a block diagram 400 of a memory system 420 that supports techniques for memory system standby mode control in accordance with examples as disclosed herein. The memory system 420 may be an example of aspects of a memory system 110 as described with reference to FIGS. 1 through 3. The memory system 420, or various components thereof, may be an example of means for performing various aspects of techniques for memory system standby mode control as described herein. For example, the memory system 420 may include a receiver component 425, a transmitter component 430, a background operation component 435, a standby mode component 440, a duration component 445, a storage component 450, or any combination thereof. Each of these components may communicate, directly or indirectly, with one another (e.g., via one or more buses).

The receiver component 425 may be configured as or otherwise support a means for receiving an indication to enter a standby mode. The transmitter component 430 may be configured as or otherwise support a means for transmitting, based on receiving the indication to enter the standby mode, an indication of a duration associated with delayed entry into the standby mode. The background operation component 435 may be configured as or otherwise support a means for performing background operations at the memory system 420 based on transmitting the indication of the duration associated with the delayed entry into the standby mode. The standby mode component 440 may be configured as or otherwise support a means for entering the standby mode after performing the background operations.

In some examples, the duration component 445 may be configured as or otherwise support a means for determining the duration associated with delayed entry into the standby mode based on a background operation type. In some examples, the transmitter component 430 may be configured as or otherwise support a means for transmitting an indication of the background operation type.

In some examples, the transmitter component 430 may be configured as or otherwise support a means for transmitting the indication of the duration associated with delayed entry into the standby mode based on a background operation type.

In some examples, the duration component 445 may be configured as or otherwise support a means for determining the duration associated with delayed entry into the standby mode based on a set of background operations identified at the memory system.

In some examples, the background operation component 435 may be configured as or otherwise support a means for determining a subset of the set of the background operations based on receiving the indication to enter the standby mode. In some examples, the background operation component 435 may be configured as or otherwise support a means for performing the determined subset of the set of the background operations based on transmitting the indication of the duration associated with delayed entry into the standby mode.

In some examples, the receiver component 425 may be configured as or otherwise support a means for receiving a response based on transmitting the indication of the duration associated with delayed entry into the standby mode. In some examples, the background operation component 435 may be configured as or otherwise support a means for performing background operations at the memory system 420 based on receiving the response.

In some examples, entering the standby mode after performing the background operations may be based on an elapsed time (e.g., of a timer of the memory system 420) associated with the duration associated with delayed entry into the standby mode.

In some examples, the storage component 450 may be configured as or otherwise support a means for storing the indication of the duration associated with delayed entry into the standby mode (e.g., in a register of the memory system), and the transmitter component 430 transmitting the indication of the duration may be based on reading the indication of the duration associated with delayed entry into the standby mode (e.g., from the register).

Figure 5:
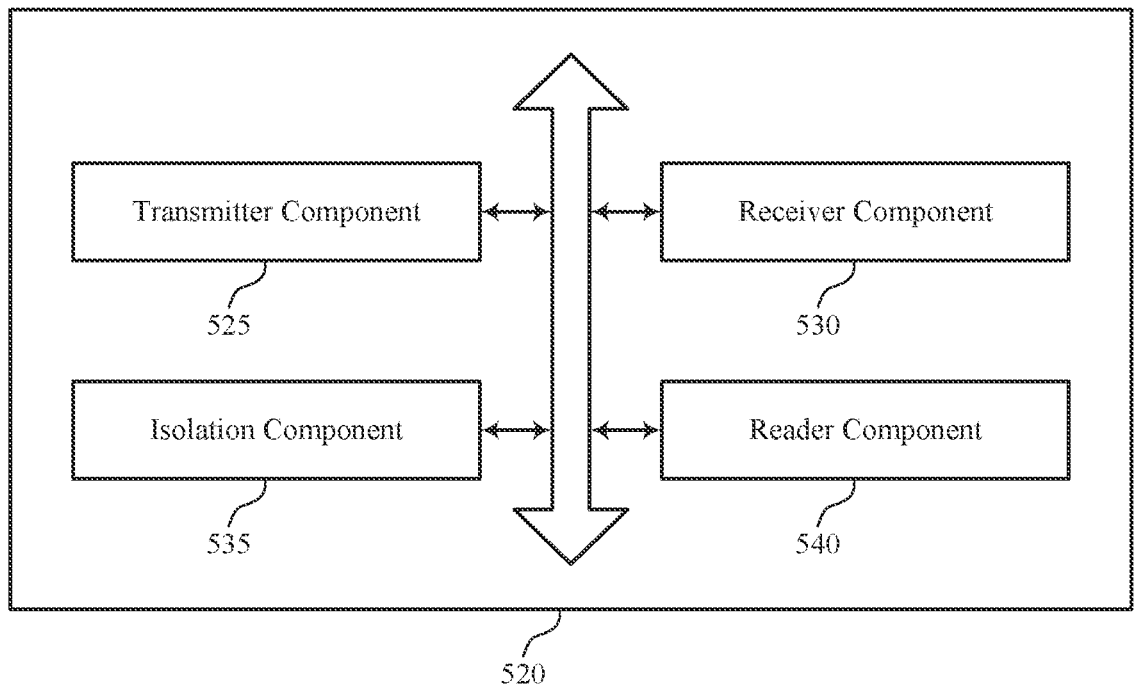

FIG. 5 illustrates a block diagram 500 of a host system 520 that supports techniques for memory system standby mode control in accordance with examples as disclosed herein. The host system 520 may be an example of aspects of a host system 105 as described with reference to FIGS. 1 through 3. The host system 520, or various components thereof, may be an example of means for performing various aspects of techniques for memory system standby mode control as described herein. For example, the host system 520 may include a transmitter component 525, a receiver component 530, an isolation component 535, a reader component 540, or any combination thereof. Each of these components may communicate, directly or indirectly, with one another (e.g., via one or more buses).

The transmitter component 525 may be configured as or otherwise support a means for transmitting an indication for a memory system to enter a standby mode. The receiver component 530 may be configured as or otherwise support a means for receiving, based on transmitting the indication for the memory system to enter the standby mode, an indication of a duration associated with delayed entry into the standby mode. The isolation component 535 may be configured as or otherwise support a means for isolating the memory system from a voltage source based on receiving the indication of the duration associated with delayed entry into the standby mode.

In some examples, the receiver component 530 may be configured as or otherwise support a means for receiving an indication of a background operation type. In some examples, the isolation component 535 may be configured as or otherwise support a means for isolating the memory system from the voltage source based on receiving the indication of the duration associated with delayed entry into the standby mode and receiving the indication of the background operation type.

In some examples, the transmitter component 525 may be configured as or otherwise support a means for transmitting a response based on receiving the indication of the duration associated with delayed entry into the standby mode. In some examples, the isolation component 535 may be configured as or otherwise support a means for isolating the memory system from the voltage source based on transmitting the response.

In some examples, to support receiving the indication of the duration associated with delayed entry into the standby mode, the reader component 540 may be configured as or otherwise support a means for reading the indication of the duration from a register of the memory system.

In some examples, the isolation component 535 isolating the memory system from the voltage source may be based on an elapsed time (e.g., of a timer of the host system 520) associated with the duration associated with delayed entry into the standby mode.

In some examples, the duration associated with delayed entry into the standby mode may be associated with performing background operations at the memory system.

Figure 6:
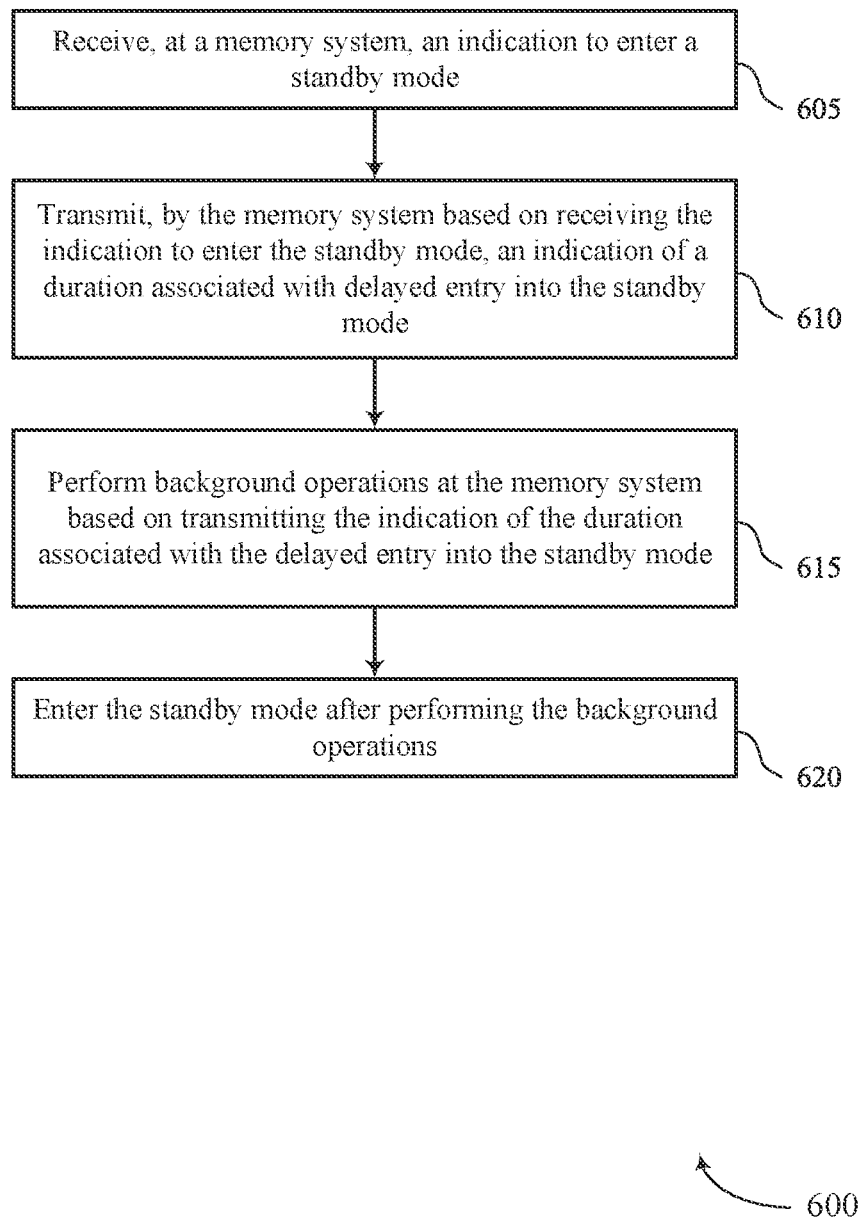
FIGS. 6 and 7 show flowcharts illustrating a method or methods that support techniques for memory system standby mode control in accordance with examples as disclosed herein.

FIG. 6 illustrates a flowchart showing a method 600 that supports techniques for memory system standby mode control in accordance with examples as disclosed herein. The operations of method 600 may be implemented by a memory system or its components as described herein (e.g., with reference to FIGS. 1 through 4). In some examples, a memory system may execute a set of instructions to control the functional elements of the device to perform the described functions. Additionally, or alternatively, the memory system may perform aspects of the described functions using special-purpose hardware.

At 605, the method may include receiving, at a memory system (e.g., at a memory system controller 115, via an interface 320), an indication to enter a standby mode. In some examples, aspects of the operations of 605 may be performed by a receiver component 425 as described with reference to FIG. 4.

At 610, the method may include transmitting, by the memory system (e.g., by the memory system controller 115, via the interface 320) based on receiving the indication to enter the standby mode, an indication of a duration associated with delayed entry into the standby mode. In some examples, aspects of the operations of 610 may be performed by a transmitter component 430 as described with reference to FIG. 4.

At 615, the method may include performing background operations at the memory system (e.g., by the memory system controller 115, on one or more memory devices 130) based on transmitting the indication of the duration associated with the delayed entry into the standby mode. In some examples, aspects of the operations of 615 may be performed by a background operation component 435 as described with reference to FIG. 4 (e.g., to perform background operations such as flush operations, folding operations, garbage collection operations, wear leveling operations, among others).

At 620, the method may include entering the standby mode (e.g., by the memory system controller 115) after performing the background operations. In some examples, aspects of the operations of 620 may be performed by a standby mode component 440 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, an indication to enter a standby mode; transmitting, by the memory system based on receiving the indication to enter the standby mode, an indication of a duration associated with delayed entry into the standby mode; performing background operations at the memory system based on transmitting the indication of the duration associated with the delayed entry into the standby mode; and entering the standby mode after performing the background operations.

Aspect 2: The method, apparatus, or non-transitory computer-readable medium of aspect 1, further including operations, features, circuitry, logic, means, or instructions, or any combination thereof for determining the duration associated with delayed entry into the standby mode based on a background operation type.

Aspect 3: The method, apparatus, or non-transitory computer-readable medium of aspect 2, further including operations, features, circuitry, logic, means, or instructions, or any combination thereof for transmitting an indication of the background operation type.

Aspect 4: The method, apparatus, or non-transitory computer-readable medium of any of aspects 1 through 3, further including operations, features, circuitry, logic, means, or instructions, or any combination thereof for transmitting the indication of the duration associated with delayed entry into the standby mode based on a background operation type.

Aspect 5: The method, apparatus, or non-transitory computer-readable medium of any of aspects 1 through 4, further including operations, features, circuitry, logic, means, or instructions, or any combination thereof for determining the duration associated with delayed entry into the standby mode based on a set of background operations identified at the memory system.

Aspect 6: The method, apparatus, or non-transitory computer-readable medium of aspect 5, further including operations, features, circuitry, logic, means, or instructions, or any combination thereof for determining a subset of the set of the background operations based on receiving the indication to enter the standby mode and performing the determined subset of the set of the background operations based on transmitting the indication of the duration associated with delayed entry into the standby mode.

Aspect 7: The method, apparatus, or non-transitory computer-readable medium of any of aspects 1 through 6, further including operations, features, circuitry, logic, means, or instructions, or any combination thereof for receiving a response based on transmitting the indication of the duration associated with delayed entry into the standby mode and performing background operations at the memory system based on receiving the response.

Aspect 8: The method, apparatus, or non-transitory computer-readable medium of any of aspects 1 through 7, where entering the standby mode after performing the background operations is based on an elapsed time associated with the duration associated with delayed entry into the standby mode.

Aspect 9: The method, apparatus, or non-transitory computer-readable medium of any of aspects 1 through 8, further including operations, features, circuitry, logic, means, or instructions, or any combination thereof for storing the indication of the duration associated with delayed entry into the standby mode in a register of the memory system, where transmitting the indication of the duration is based on reading the indication of the duration associated with delayed entry into the standby mode from the register.

Figure 7:
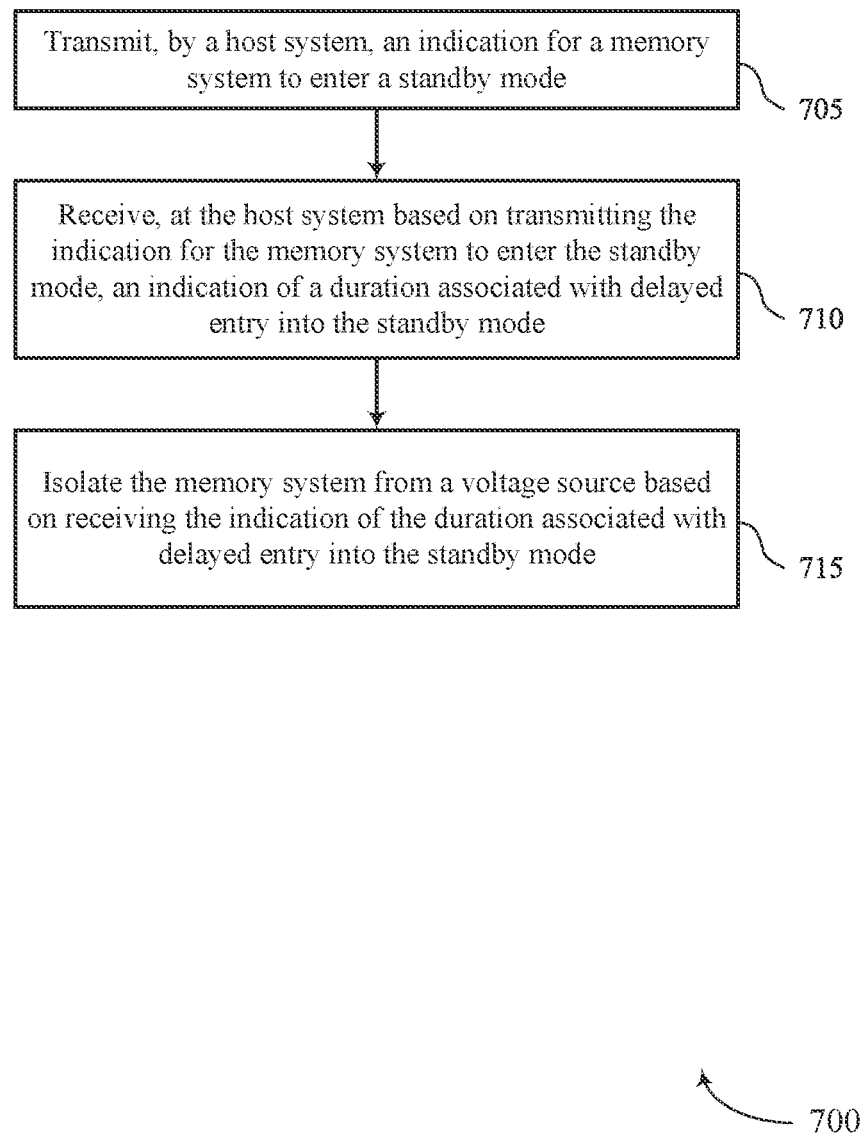

FIG. 7 illustrates a flowchart showing a method 700 that supports techniques for memory system standby mode control in accordance with examples as disclosed herein. The operations of method 700 may be implemented by a host system or its components as described herein (e.g., with reference to FIGS. 1 through 3 and 5). In some examples, a host system may execute a set of instructions to control the functional elements of the device to perform the described functions. Additionally, or alternatively, the host system may perform aspects of the described functions using special-purpose hardware.

At 705, the method may include transmitting, by a host system (e.g., by a host system controller 106, via an interface 320), an indication for a memory system to enter a standby mode. In some examples, aspects of the operations of 705 may be performed by a transmitter component 525 as described with reference to FIG. 5.

At 710, the method may include receiving, at the host system (e.g., by the host system controller 106, via the interface 320) based on transmitting the indication for the memory system to enter the standby mode, an indication of a duration associated with delayed entry into the standby mode. In some examples, aspects of the operations of 710 may be performed by a receiver component 530 as described with reference to FIG. 5.

At 715, the method may include isolating (e.g., using a switching component 108) the memory system from a voltage source (e.g., a voltage source of a voltage supply 107) based on receiving the indication of the duration associated with delayed entry into the standby mode. In some examples, aspects of the operations of 715 may be performed by an isolation component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 10: A method, apparatus, or non-transitory computer-readable medium including operations, features, circuitry, logic, means, or instructions, or any combination thereof for transmitting, by a host system, an indication for a memory system to enter a standby mode; receiving, at the host system based on transmitting the indication for the memory system to enter the standby mode, an indication of a duration associated with delayed entry into the standby mode; and isolating the memory system from a voltage source based on receiving the indication of the duration associated with delayed entry into the standby mode.

Aspect 11: The method, apparatus, or non-transitory computer-readable medium of aspect 10, further including operations, features, circuitry, logic, means, or instructions, or any combination thereof for receiving an indication of a background operation type and isolating the memory system from the voltage source based on receiving the indication of the duration associated with delayed entry into the standby mode and receiving the indication of the background operation type.

Aspect 12: The method, apparatus, or non-transitory computer-readable medium of any of aspects 10 through 11, further including operations, features, circuitry, logic, means, or instructions, or any combination thereof for transmitting a response based on receiving the indication of the duration associated with delayed entry into the standby mode and isolating the memory system from the voltage source based on transmitting the response.

Aspect 13: The method, apparatus, or non-transitory computer-readable medium of any of aspects 10 through 12, where receiving the indication of the duration associated with delayed entry into the standby mode includes operations, features, circuitry, logic, means, or instructions, or any combination thereof for reading the indication of the duration from a register of the memory system.

Aspect 14: The method, apparatus, or non-transitory computer-readable medium of any of aspects 10 through 13, where isolating the memory system from the voltage source is based on an elapsed time associated with the duration associated with delayed entry into the standby mode.

Aspect 15: The method, apparatus, or non-transitory computer-readable medium of any of aspects 10 through 14, where the duration associated with delayed entry into the standby mode is associated with performing background operations at the memory system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
  one or more memory devices of a memory system; and
  a controller of the memory system coupled with the one or more memory devices and configured to cause the apparatus to:
    receive an indication to enter a standby mode;
    transmit, based on receiving the indication to enter the standby mode, an indication of a duration associated with delayed entry into the standby mode;
    perform background operations at the memory system based on transmitting the indication of the duration associated with the delayed entry into the standby mode; and
    enter the standby mode after performing the background operations.

2. The apparatus of claim 1, wherein the controller is further configured to cause the apparatus to:
  determine the duration associated with delayed entry into the standby mode based on a background operation type.

3. The apparatus of claim 2, wherein the controller is further configured to cause the apparatus to:
  transmit an indication of the background operation type.

4. The apparatus of claim 1, wherein the controller is further configured to cause the apparatus to:
  transmit the indication of the duration associated with delayed entry into the standby mode based on a background operation type.

5. The apparatus of claim 1, wherein the controller is further configured to cause the apparatus to:
  determine the duration associated with delayed entry into the standby mode based on a set of background operations identified at the controller.

6. The apparatus of claim 5, wherein the controller is further configured to cause the apparatus to:
  determine a subset of the set of the background operations based on receiving the indication to enter the standby mode; and
  perform the determined subset of the set of the background operations based on transmitting the indication of the duration associated with delayed entry into the standby mode.

7. The apparatus of claim 1, wherein the controller is further configured to cause the apparatus to:
  receive a response based on transmitting the indication of the duration associated with delayed entry into the standby mode; and
  perform background operations at the memory system based on receiving the response.

8. The apparatus of claim 1, wherein the controller is further configured to cause the apparatus to:
  enter the standby mode after performing the background operations based on an elapsed time associated with the duration associated with delayed entry into the standby mode.

9. The apparatus of claim 1, wherein the controller is further configured to cause the apparatus to:
  store the indication of the duration associated with delayed entry into the standby mode in a register of the apparatus; and
  transmit the indication of the duration based on reading the indication of the duration associated with delayed entry into the standby mode from the register.

10. An apparatus, comprising:
  a voltage source; and
  a controller configured to couple with a memory system, wherein the controller is configured to cause the apparatus to:
    transmit an indication for the memory system to enter a standby mode;
    receive, based on transmitting the indication for the memory system to enter the standby mode, an indication of a duration associated with delayed entry into the standby mode; and isolate the memory system from the voltage source based on receiving the indication of the duration associated with delayed entry into the standby mode.

11. The apparatus of claim 10, wherein the controller is further configured to cause the apparatus to:
receive an indication of a background operation type; and
isolate the memory system from the voltage source based on receiving the indication of the duration associated with delayed entry into the standby mode and receiving the indication of the background operation type.

12. The apparatus of claim 10, wherein the controller is further configured to cause the apparatus to:
transmit a response based on receiving the indication of the duration associated with delayed entry into the standby mode; and
isolate the memory system from the voltage source based on transmitting the response.

13. The apparatus of claim 10, wherein, to receive the indication of the duration associated with delayed entry into the standby mode, the controller is configured to cause the apparatus to:
read the indication of the duration from a register of the memory system.

14. The apparatus of claim 10, wherein the controller is further configured to cause the apparatus to:
isolate the memory system from the voltage source based on an elapsed time associated with the duration associated with delayed entry into the standby mode.

15. The apparatus of claim 10, wherein the duration associated with delayed entry into the standby mode is associated with performing background operations at the memory system.

16. A method, comprising:
receiving, at a memory system, an indication to enter a standby mode;
transmitting, by the memory system based on receiving the indication to enter the standby mode, an indication of a duration associated with delayed entry into the standby mode;
performing background operations at the memory system based on transmitting the indication of the duration associated with the delayed entry into the standby mode; and
entering the standby mode after performing the background operations.

17. The method of claim 16, further comprising:
determining the duration associated with delayed entry into the standby mode based on a background operation type.

18. The method of claim 16, further comprising:
transmitting the indication of the duration associated with delayed entry into the standby mode based on a background operation type.

19. The method of claim 16, further comprising:
determining the duration associated with delayed entry into the standby mode based on a set of background operations identified at the memory system.

20. The method of claim 16, further comprising:
receiving a response based on transmitting the indication of the duration associated with delayed entry into the standby mode; and
performing background operations at the memory system based on receiving the response.

* * * * *